R. M. HUNTER.
VALVE.
APPLICATION FILED OCT. 24, 1914.
1,197,635.
Patented Sept. 12, 1916.
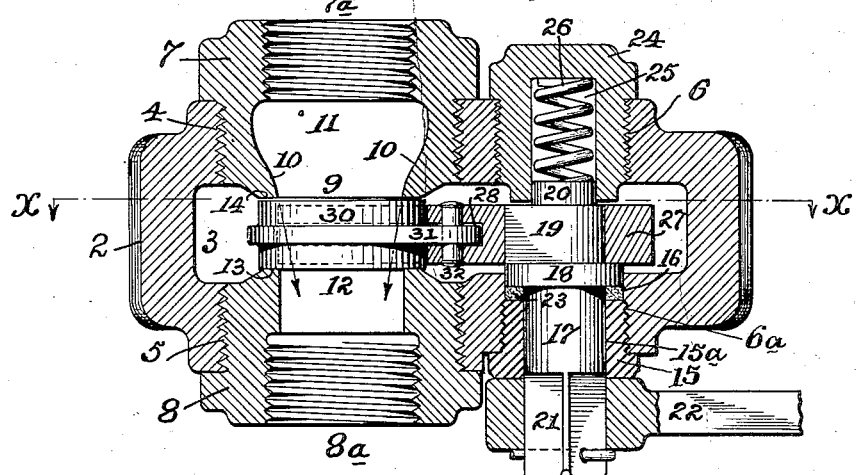
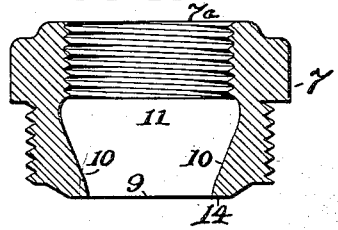
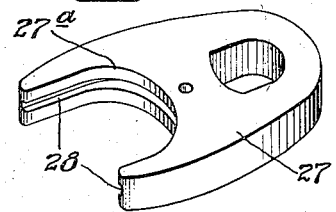
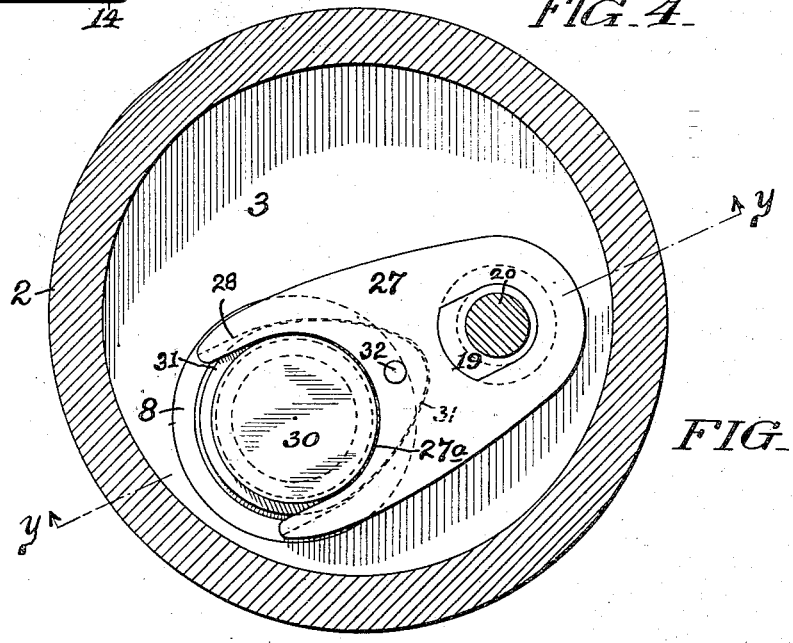
WITNESSES
Daniel Webster Jr.
E. W. Smith
INVENTOR

UNITED STATES PATENT OFFICE.

RUDOLPH M. HUNTER, OF PHILADELPHIA, PENNSYLVANIA, ASSIGNOR TO FORGED STEEL VALVE COMPANY, INC., A CORPORATION OF NEW YORK.

VALVE.

1,197,635.  Specification of Letters Patent.  Patented Sept. 12, 1916.

Application filed October 24, 1914. Serial No. 868,405.

*To all whom it may concern:*

Be it known that I, RUDOLPH M. HUNTER, citizen of the United States, and resident of Philadelphia, county of Philadelphia, and State of Pennsylvania, have invented an Improvement in Valves, of which the following is a specification.

The object of my invention is to provide a construction of quick-acting valve, suitable as a blow-off valve for boilers and for other purposes, which shall be simple in construction durable in use and inexpensive to manufacture.

My object is also to provide a construction which may permit the valve to be used as a reversible valve, and which may also permit the inlet and outlets to be reversed upon the body.

My invention comprehends features of construction which are fully set out hereinafter and more particularly defined in the claims.

Referring to the drawings:—Figure 1 is a sectional elevation of my improved valve taken on line *y—y* of Fig. 2; Fig. 2 is a sectional plan view of the same taken on line *x—x* of Fig. 1; Fig. 3 is a sectional elevation of the inlet nozzle showing a modification; and Fig. 4 is a perspective view of the swinging arm for moving the valve piece.

2 is a cast metal body and formed with an internal valve chamber 3. This body 2 is provided with a through passage formed by the screw-threaded apertures 4 and 5 which are respectively fitted with the nozzle portions 7 and 8, the former being the inlet nozzle and the latter the outlet. In addition to the said apertures 4 and 5, which are in alinement, the body is also provided with apertures 6 and 6ª, likewise in alinement, but laterally disposed with respect to the apertures 4 and 5. The aperture 6ª is fitted with a bushing 15 having an aperture 15ª which acts as a bearing for the rocking spindle 17 to actuate the valve piece; whereas the aperture 6 receives a screw-threaded plug 24 having an internal recess 25 which receives the spring 26 and also preferably the journal portion 20 of the spindle 17, whereby the spindle is journaled both in the bushing 15 and in the plug 24 and is pressed longitudinally under the action of the coil spring 26. The spindle 17 is further provided with an annular collar 18 which fits into an annular recess or socket portion 16 in the body, in which is located an annular copper ring 23 acting as a packing and upon which the collar rests to form a tight joint. The packing ring 23 rests upon the end of the bushing 15, and if desired, may be integral with the bushing. Immediately above the collar 18, and between it and the bearing 20, the spindle is provided with an elongated portion 19 constituting a block for forming a mechanical connection with the swinging arm 27 which is employed to move the valve piece. The outer end of the spindle 17 is made polygonal-shape, and to it is fitted an operating lever 22, and by which the spindle may be rocked. During the operation of the valve, the spring 26 tends to assist the pressure within the valve in holding the collar 18 tightly upon the packing and maintaining a steam or liquid tight joint, and the spring further acts to prevent the spindle becoming loose or rattling in its bearings. The inner end of the plug 24 provides an annular shoulder, which prevents material end play to the spindle, and also acts as a guide to hold the swinging arm 27 against material end play on the spindle, thereby preventing it from shifting so as to strike the inlet nozzle.

The inlet nozzle 7 is provided with a valve seat 14 surrounding the aperture 9, and said nozzle is moreover provided with an expansion chamber 11 having inclined walls 10 forming a more or less conical aperture for directing the flowing fluid in such a manner that it assumes a conical shape, as indicated by the arrows, and thereby reduces the wear upon the bearing surface of the valve seat 13 surrounding the outlet aperture 12 of the outlet nozzle 8. In this manner, any scale or dirt which may be forced through the valve is so guided as to prevent objectionable bombardment upon the valve seat 13, which, if not prevented, would cause excessive wear thereof. The inlet nozzle 7 is screw-threaded as at 7ª to receive a pipe, and likewise, the outlet nozzle 8 is screw-threaded as at 8ª, for receiving the discharge pipe. As shown in Fig. 1, the diameters of the apertures 9 and 12 of the nozzles and the diameters of the pipes to be used, would be substantially the same; but if desired, the inlet nozzle 7 may have the screw-threaded aperture 7ª for the inlet pipe of larger diameter than the screw-threaded aperture 8ª of the outlet nozzle, this difference permitting the area of the inlet pipe to be larger than the area of the inlet nozzle 9, so that the flow of the fluid directly through the pipe will form an annular line of impact against the inclined conical walls 10 to insure the positive conical formation of the fluid in passing through the valve. I therefore do not restrict myself to the apertures 7ª and 8ª being of the same diameter.

While the valve is illustrated to receive screw-threaded pipes, it is manifest that the nozzles 7 and 8 may be made in suitable shape for connection with any desired tubular conduits.

The swinging arm 27 carried by the spindle 17 is provided with a slotted end, as indicated at 27ª, and the side walls of this slotted portion are recessed as at 28 to form guiding grooves. 30 is the valve piece, and is preferably formed of bronze or brass, and is of a thickness, between its opposite faces, slightly less than the distance between the valve seats 13 and 14 of the nozzles, as is clearly indicated in Fig. 1. The perimeter of the valve piece 30 is provided with a radial flange 31 which fits into the grooves 28 of the swinging arm 27, and this flange may be elongated in a direction toward the spindle, and the valve piece is secured in the swinging arm by means of a pin 32. The flange 31 forms a relatively loose fit in the groove, and the valve piece 30 itself preferably fits the slotted end of the arm so as not to bind therein. I do not restrict myself to the extent of the radial flange 31, as any suitable connection between the valve piece and the swinging arm may be employed so long as the former is carried with the latter in its swinging movements, and at the same time is preferably guided so as not to materially become out of alinement with the space between the valve seats 13 and 14. The valve piece 30 may be easily removed from the swinging arm 27, when required for replacement or repairs, but normally, it is held by the pin 32 in such connection with the arm that it is positively moved laterally with the swinging of the arm, while separately or in conjunction with the swinging arm it has capacity for sufficient movement to enable it to seat upon either of the seats 13 or 14 according to the direction of the passing of the fluid.

The nozzles 7 and 8 have their inner ends beveled, leading up to the seat portions, so that in swinging the valve piece from open to closed positions, the said valve piece will ride up on the valve and not be materially checked by abrupt shoulders. Furthermore, while the body of the valve may be of cast iron, the bushings 7 and 8 may be of steel with hardened valve seats or they may be of cast iron having case hardened seats, or formed in any other suitable manner which will give proper wearing capacity to the valve seats. In the preferred construction, I form the length of the nozzles 7 and 8 such that they may be interchanged on the body for reversing the inlet and outlet thereof; and moreover, the valve piece 30 may be reversed in the swinging arm to suit such reversal of the nozzles or for simply reversing the valve piece itself to compensate for wear on the discharge side, or the arm with the valve piece may be wholly reversed upon the spindle. It will be observed that the diameter of the aperture 6ª closed with the bushing 15 is slightly in excess of the diameter of the collar 18 of the spindle, so that when the bushing 15 is removed, the spindle and the packing ring 23 may be withdrawn, as may also the spring 26. After the removal of the spindle, the valve piece and the swinging arm may be removed through one of the apertures 4 or 5 by the removal of the corresponding nozzle. The plug 24 may be separately removed when it is desired to change the spring in case it should lose its temper, or if for any reason it is desired to lubricate the interior of the valve in those cases where such might be an advantage. Moreover, the plug 24 shields the spring against becoming clogged with dirt, and against the direct action of the heated water or steam, so that it maintains its elasticity and operativeness to a greater extent than would be the case where it is exposed to these elements within the body in an unprotected condition. If desired, the plug may be integral with the body, but I prefer to make it separate as shown.

While I have shown my improved valve in the construction which I prefer in practice, I do not restrict myself to the details, as these may be modified in various ways without departing from the spirit of the invention.

Having now described my invention, what I declare as new and desire to secure by Letters Patent, is:—

1. In a valve, a body structure having an internal chamber formed with screw-threaded apertures through its opposite walls said apertures in alinement, combined with detachable nozzles screwed into the apertures of the body and presenting opposite annular valve seats respectively surrounding inlet and outlet apertures whereby said nozzles may be interchangeable, a rocking spindle journaled in the body to one side of the nozzles and forming a packed joint therewith, a swinging arm arranged within the chamber of the body and carried on the end of the spindle, and a valve piece formed of a single part having opposite seating faces of a greater thickness than the swinging arm and of a less thickness than the distance between the valve seats and mechanically connected to the free end of the swinging arm so as to be supported and carried thereby and having its opposite faces extending beyond the faces of the swinging arm so as to be free to contact with the valve seat of either nozzle.

2. In a valve, a body structure having an internal chamber formed with screw-threaded apertures through its opposite walls said apertures in alinement, combined with detachable nozzles screwed into the apertures of the body and presenting opposite annular valve seats respectively surrounding inlet and outlet apertures, a rocking spindle journaled in the body to one side of the nozzles having an annular self-sealing joint at the inner part of the casing and forming a packed joint therewith, a plug having an internal recess screwed into the side of the body in alinement with the spindle and providing a closed chamber, a spring arranged within the chamber of said plug and pressing endwise upon the spindle, a swinging arm arranged within the chamber of the body and carried on the end of the spindle, and a valve piece of a greater thickness than the swinging arm and mechanically connected to the free end of the swinging arm so as to be supported and carried thereby but free to contact with the valve seat of either nozzle.

3. In a valve, a body structure having an internal chamber formed with screw-threaded apertures through its opposite walls said apertures in alinement, combined with detachable nozzles screwed into the apertures of the body and presenting opposite annular valve seats respectively surrounding inlet and outlet apertures, a bushing also arranged through one face of the body and providing at the inner end an annular recess, a spindle journaled in the bushing and having a collar fitting into the recess, a packing ring arranged under the collar and between it and the bushing, a swinging arm arranged within the internal chamber of the body and carried on the end of the spindle, and a valve piece of a thickness slightly greater than the thickness of the swinging arm and less than the distance between the two valve seats mechanically connected to the swinging arm so as to be moved with it and by which the swinging arm is prevented from contacting with the valve seats.

4. In a valve, a body structure having an internal chamber formed with screw-threaded apertures through its opposite walls said apertures in alinement, combined with detachable nozzles screwed into the apertures of the body and presenting opposite annular valve seats respectively surrounding inlet and outlet apertures, a bushing also arranged through one face of the body and providing at the inner end an annular recess, a spindle journaled in the bushing and having a collar fitting into the recess, a packing ring arranged under the collar and between it and the bushing, a swinging arm arranged within the internal chamber of the body and carried on the end of the spindle, a plug screwed into the body for providing a shoulder for limiting the longitudinal motion of the swinging arm upon the spindle, a spring inclosed within and shielded by the plug for pressing the spindle longitudinally in the direction toward the bushing, and a valve piece of a thickness slightly greater than the swinging arm and less than the distance between the two valve seats mechanically connected to the swinging arm so as to be moved with it and by which the swinging arm is prevented from contacting with the valve seats.

5. In a valve, the combination of a body having inlet and outlet ports, a rocking spindle provided with a collar and journaled in the body and its collar providing a packed joint within the body said spindle also having a bearing at its inner free end, a bushing screwed into the body and providing a bearing in which the spindle is journaled, a ring packing between the end of the bushing and collar and upon which the collar presses, a recessed plug screwed into the body and in which the bearing at the inner end of the spindle is journaled, a coil spring within the recess of the plug and shielded thereby for pressing upon the bearing end of the spindle and causing the collar thereof to make a tight joint and whereby the spring may be removed and replaced, a swinging arm carried by the spindle, held against movement in one direction longitudinally of the spindle by the collar thereof and in the other direction by the inner end of the recessed plug, and a valve piece moved by the swinging arm.

6. In a valve, the combination of a cast metal body having an internal chamber the opposite walls of which are provided with screw-threaded openings, with interchangeable inlet and outlet nozzles screwed into the respective apertures and providing oppositely directed apertures and valve seats in alinement whereby the inlets and outlets may be reversed to suit reversal in the direction of flow, a spindle journaled in the body, a swinging arm carried by the inner end of the spindle so as to swing transversely with respect to the axial line through the apertures and valve seats, and an adjustable valve piece carried by the swinging arm and adapted to seat upon either of the valve seats.

7. In a valve, the combination of a cast metal body having an internal chamber the opposite walls of which are provided with screw-threaded openings, with interchangeable inlet and outlet nozzles screwed into the respective apertures and providing oppositely directed apertures and valve seats in alinement, a spindle journaled in the body, a swinging arm carried by the inner end of the spindle so as to swing transversely with respect to the axial line through the apertures and valve seats and having a slotted end providing grooves, a valve piece having peripheral flanges fitting the grooves of the swinging arm, and a jointed connection between the flange of the valve piece and the swinging arm.

8. In a valve, a body formed of a casting having an internal chamber provided with screw-threaded alined apertures in its opposite walls, combined with circular rotatable inlet and outlet nozzles screwed into the respective apertures from the outside of the body and in which said nozzles are interchangeable in respect to the apertures, a rocking spindle, and a valve device operated by the spindle and movable between the nozzles to control the flow of fluid through the said nozzles.

9. In a valve, the body provided with an outlet aperture and valve seat and a laterally movable valve piece adapted to be moved relatively to the outlet aperture and its seat, combined with an inlet nozzle screwed into the body in alinement with the outlet aperture said nozzle having an aperture of approximately the same diameter as the diameter of the outlet nozzle and also provided with an expansion chamber of greater diameter than the opening through the nozzles and having substantially conical side walls terminating in the inlet aperture for causing the fluid passing through the inlet aperture to assume a conical shape where it passes through the outlet aperture.

10. In a valve, a body providing a chamber with inlet and outlet apertures arranged in alinement, combined with a swinging arm arranged within the body and having its free end provided with a deep slotted end, the face of which is provided with a groove, a valve piece of greater thickness than the thickness of the swinging arm and provided with a circumferential flange fitting into the groove in the slot of the swinging arm, and means for loosely holding the valve piece in the slot and with its flange engaging the groove, the construction being such that the valve piece may be swung into and out of alinement with the inlet and outlet ports by the oscillation of the swinging arm.

In testimony of which invention, I hereunto set my hand.

R. M. HUNTER.

Witnesses:
HORACE D. REEVE,
E. W. SMITH.